United States Patent
Fuchs et al.

(10) Patent No.: US 9,189,371 B2
(45) Date of Patent: Nov. 17, 2015

(54) DYNAMIC LOAD TESTING

(75) Inventors: Stefan Fuchs, Wiesloch (DE); Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 584 days.

(21) Appl. No.: 13/481,509

(22) Filed: May 25, 2012

(65) Prior Publication Data

US 2013/0317781 A1     Nov. 28, 2013

(51) Int. Cl.
*G06F 11/30*     (2006.01)
*G06F 11/36*     (2006.01)
*G06F 11/34*     (2006.01)

(52) U.S. Cl.
CPC ........ *G06F 11/3672* (2013.01); *G06F 11/3409* (2013.01); *G06F 11/3433* (2013.01)

(58) Field of Classification Search
None
See application file for complete search history.

(56) References Cited

U.S. PATENT DOCUMENTS

| | | | |
|---|---|---|---|
| 6,601,020 B1* | 7/2003 | Myers | 702/186 |
| 6,738,813 B1* | 5/2004 | Reichman | 709/224 |
| 2002/0198985 A1* | 12/2002 | Fraenkel et al. | 709/224 |
| 2007/0282567 A1* | 12/2007 | Dawson et al. | 702/186 |
| 2008/0263410 A1* | 10/2008 | Mittal et al. | 714/47 |
| 2010/0333072 A1* | 12/2010 | Dulip et al. | 717/128 |

* cited by examiner

*Primary Examiner* — Timothy H Hwang
(74) *Attorney, Agent, or Firm* — Buckley, Maschoff & Talwalkar LLC

(57) ABSTRACT

A system includes sending of requests to a computing system based on a first number of users associated with a load test, evaluation of one or more characteristics of the computing system while sending the requests, determination to modify the first number of users to a second number of users based on the one or more evaluated characteristics, and sending of requests to the computing system based on the second number of users.

17 Claims, 9 Drawing Sheets

DYNAMIC LOAD TESTING

BACKGROUND

Conventional testing systems apply loads to target computing systems based on predefined schedules. That is, a testing system may simulate activity of a certain number of users during a first predefined time period, and then, during a second predefined time period, may simulate the activity of a second number of users.

DETAILED DESCRIPTION

The following description is provided to enable any person in the art to make and use the described embodiments. Various modifications, however, will remain readily apparent to those in the art.

Figure 1:
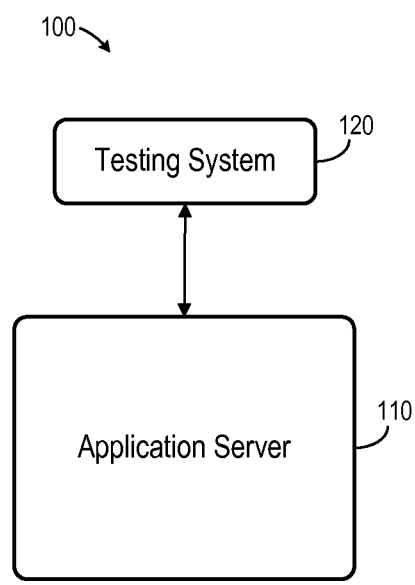
FIG. 1 is a block diagram of a system according to some embodiments.

FIG. 1 is a block diagram of system 100. System 100 represents a logical architecture for describing some embodiments, and actual implementations may include more, fewer and/or different components arranged in any manner. The elements of system 100 may represent software elements, hardware elements, or any combination thereof. For example, system 100 may be implemented using any number of computing devices, and one or more processors within system 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

System 100 includes application server 110 and testing system 120. Application server 110 and testing system 120 may each include at least one processor and one memory device. Application server 110 may be configured to receive requests from client applications/devices and to provide information in response via Web Services or any other protocol. For example, application server 110 may execute one or more enterprise database applications for providing and/or manipulating enterprise data stored in one or more databases (not shown). Such database applications may provide, for example, business reporting, inventory control, online shopping, and/or any other suitable functions.

Testing system 120 may comprise any one or more computing devices and may operate as described below to apply loads to application server 110. Application of loads may include sending requests to application server 110 which simulate a particular number of users of application server 110. Testing system 120 may also operate to evaluate characteristics of application server 110 during the application of loads thereto. Such characteristics may indicate processor usage (e.g., percentage load), memory usage, server response times, and any other load-based characteristic that is or becomes known.

Figure 2:
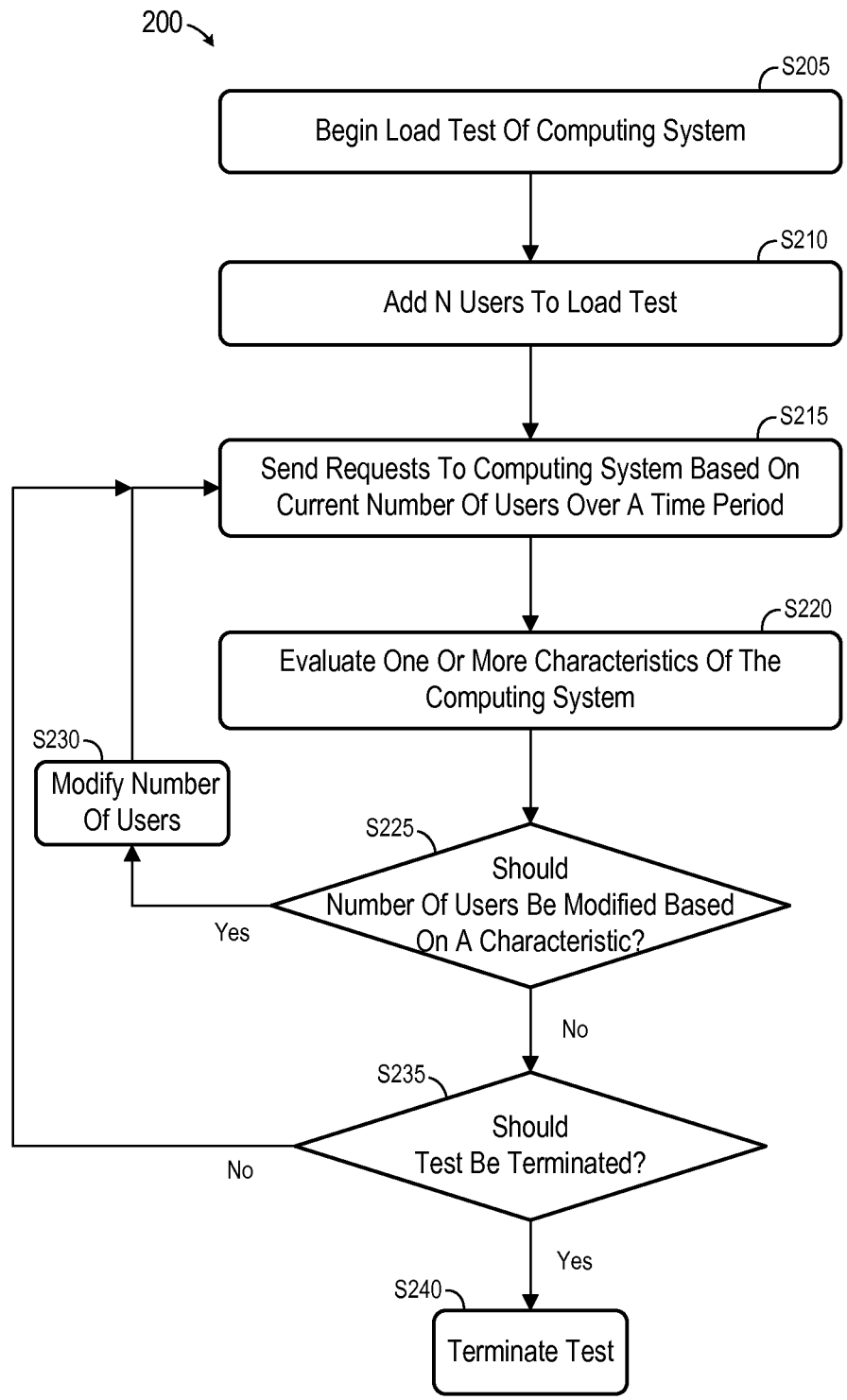
FIG. 2 is a flow diagram according to some embodiments.

FIG. 2 is a flow diagram of generic load testing process 200 according to some embodiments. Process 200 and each other process described herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. Accordingly, a processor of any suitable device or devices (e.g., testing system 120) may execute the program code to cause the device or devices to operate as described. In some embodiments, hard-wired circuitry may be used in place of, or in combination with, program code for implementation of processes according to some embodiments. Embodiments are therefore not limited to any specific combination of hardware and software.

Initially, a load test of a computing system begins at S205. According to one example, testing system 120 executes program code at S205 to begin a load test of application server 110. This process may include establishing a connection with application server 110.

Next, at S210, a number (i.e., N) of users are added to the load test. The number N may be predetermined via coding, and various alternatives will be described in more detail below. S210 may comprise establishing sessions for each of the N users within application server 110.

Requests are sent to the computing system at S215 based on the current number of users associated with the load test. Initially, this current number is equal to N. Known systems may be employed to send requests to the computing system based on the current number of users.

At S220, one or more characteristics of the computing system are evaluated as described above. Any of the one or more characteristics may be related to the processing performance and/or processing load of application server 110. S220 may comprise determining one or more of percentage load, memory usage, server response times, and any other load-based characteristic of application server 110.

Next, it is determined at S225 whether the current number of users should be modified. This determination may be based on the value of one or more evaluated characteristics and the specific logic of the determination is based on the goals of the current test. Detailed examples of different testing goals and strategy are provided below.

If the determination at S225 is positive, flow proceeds to S230 to modify the number of users within the current load test. Modification may include increasing or decreasing the number of users, by a fixed amount (e.g., N), or by any other amount deemed suitable according to the goals of the load test. Flow then returns to S215 and proceeds as described above.

If the determination at S225 is negative, flow continues to S235 to determine whether the test should be terminated. Again, this determination may proceed based on the goals of the load test. For example, S235 may include determining whether the value of a characteristic has reached a desired value, or whether the value has reached the desired value for a desired length of time.

In some embodiments, S235 may also or alternatively include determining whether the load test is proceeding as planned. For example, if the number of users has been modified more than a threshold number of times, it may be determined at S235 to terminate the test and to restart the test with new initial parameters (e.g., N).

Figure 3:
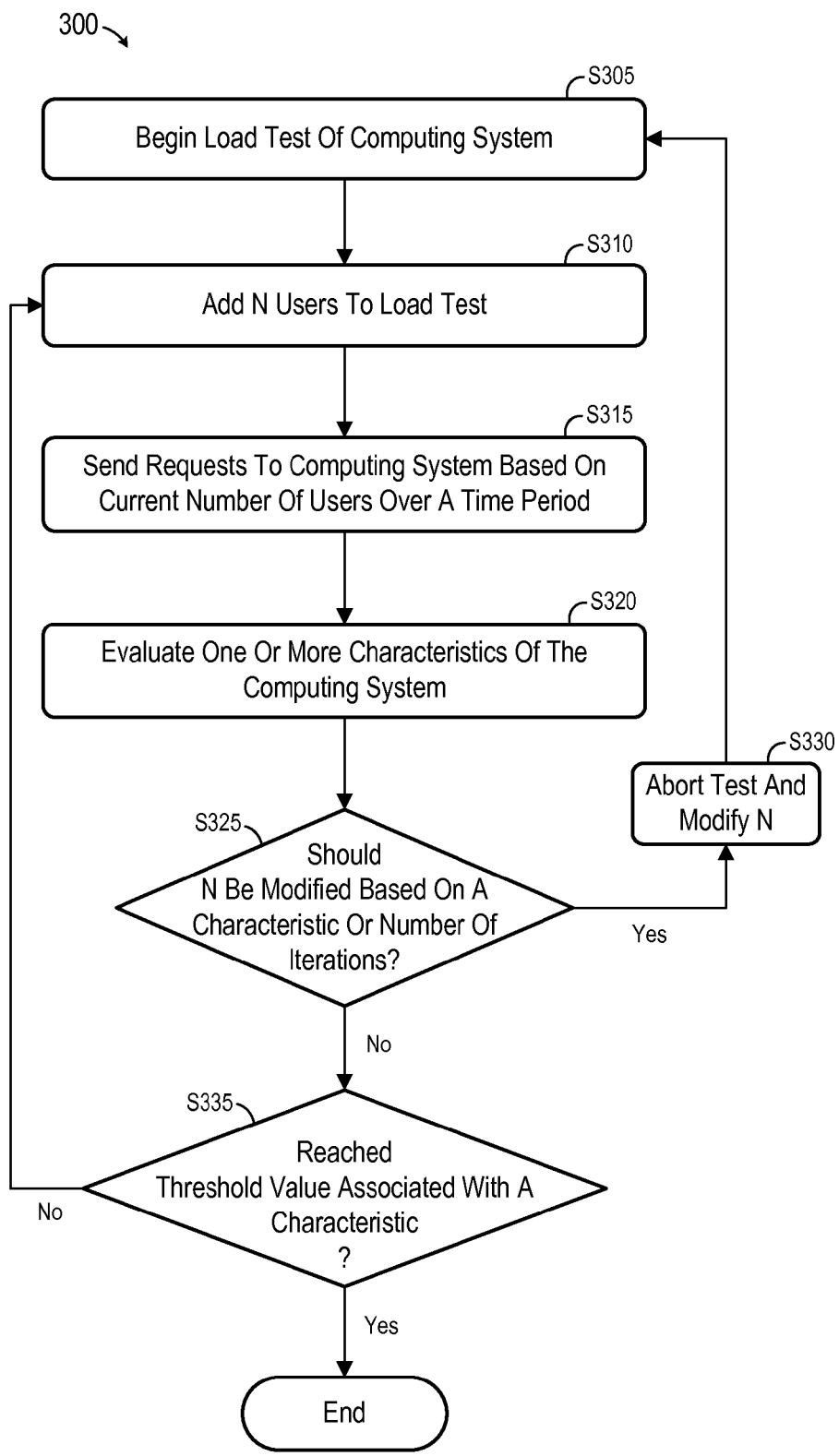
FIG. 3 is a flow diagram according to some embodiments.

FIG. 3 is a diagram of process 300 for evaluating the scalability of a computing system according to some embodiments. S305 and S310 proceed as described above with respect to S205 and S210 of process 200.

At S315, requests are sent to the computing system based on the current number of users associated with the load test. More specifically, the requests are sent at S315 for a predetermined period of time. This predetermined period of time may be selected in order to allow the computing system to reach a substantially steady state before evaluating characteristics thereof and/or adding additional users.

Figure 4:
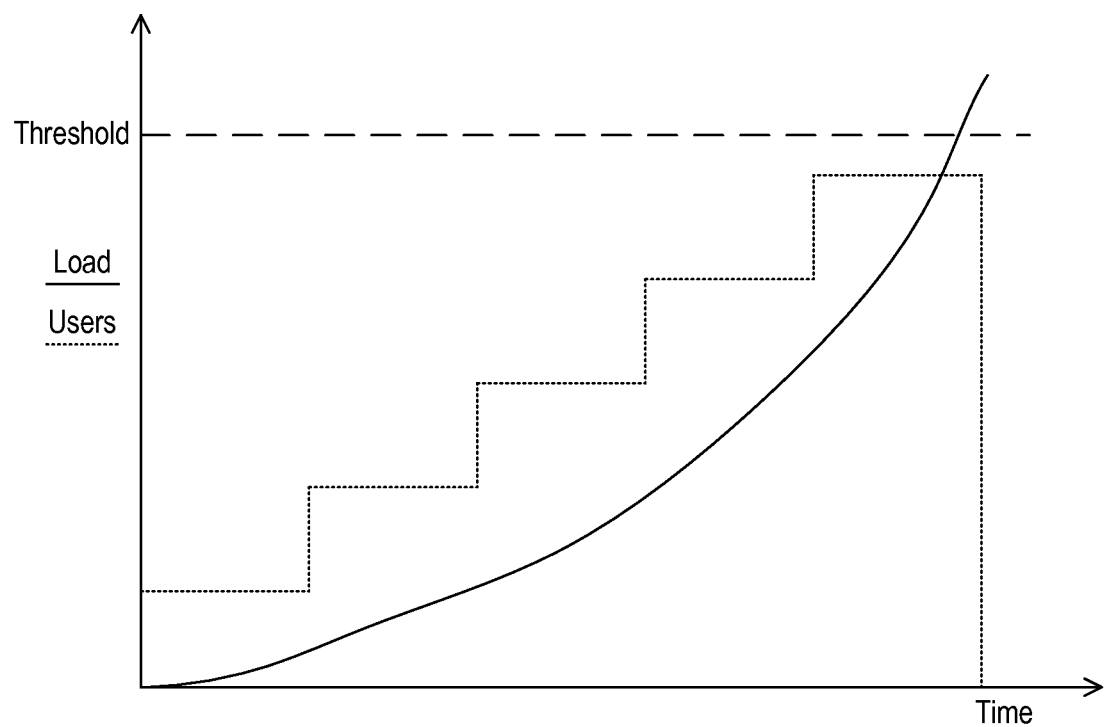
FIG. 4 is a diagram illustrating operation of a system according to some embodiments.

FIG. 4 illustrates process 300 according to some embodiments. As shown, the initial number of users remains constant for a predetermined time (e.g., 1 s, 10 min, etc.).

At S320, one or more characteristics of the computing system are evaluated as described above. Next, it is determined at S325 whether the number of users added at S310 (i.e., N) should be modified. This determination may be based on the value of one or more evaluated characteristics and/or on a number of iterations of steps S310 et seq. that have already occurred.

S325 is intended to prevent the user curve of FIG. 4 from having too many (i.e., if N is too small) or too few (i.e., if N is too large) "steps". If it is determined at S325 that N should be modified, the test is aborted and N is modified at S330, and another load test begins at S305, using the modified value of N.

If the determination at S325 is negative, it is determined at S335 whether a threshold value associated with one or more of the characteristics evaluated at S320 has been reached. If not, flow returns to S310. Therefore, flow cycles between S310 and S350 to add "steps" to FIG. 4 until the characteristic (i.e., load) threshold has been reached. Process 300 terminates once it is determined at S335 that threshold value has been reached.

Figure 5:
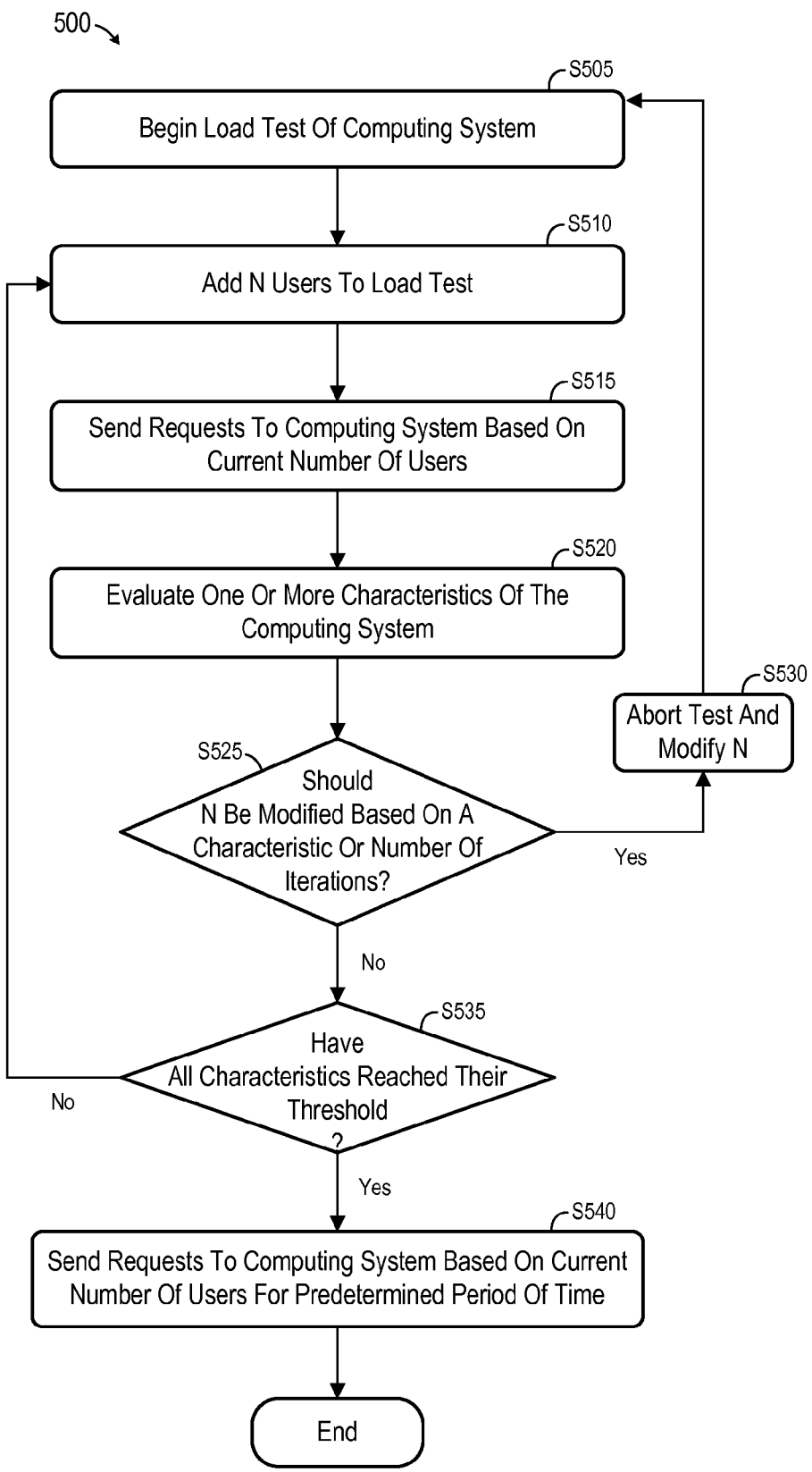
FIG. 5 is a flow diagram according to some embodiments.

FIG. 5 is a diagram of process 500 for evaluating the stability of a computing system according to some embodiments. S505 through S530 may proceed as described above with respect to S305 through S330 of process 300.

Figure 6:
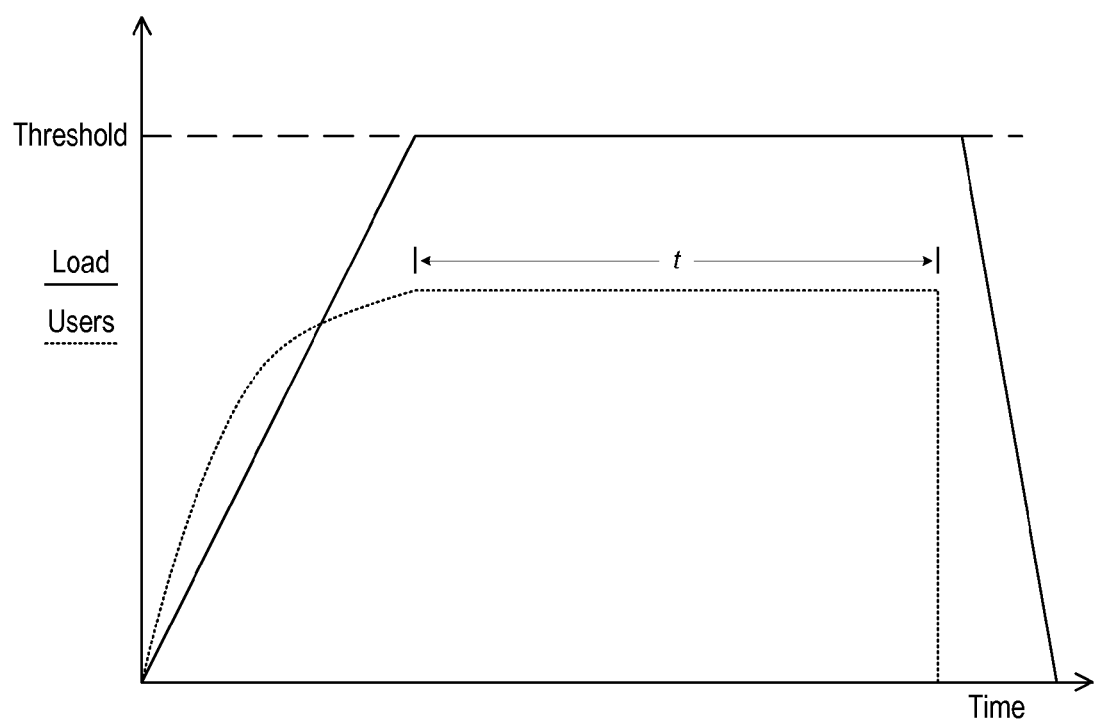
FIG. 6 is a diagram illustrating operation of a system according to some embodiments.

However, FIG. 6 illustrates a difference between the implementations of process 300 and process 500 according to some embodiments. As described above, process 300 may provide a "step" pattern as shown in FIG. 4 by pausing at S315 for a predetermined period of time. In contrast, and as shown in FIG. 6, some embodiments of process 500 continuously loop between S510 and S535, without an extended pause at S515, to add users until it is determined at S535 that all relevant characteristics have reached their respective thresholds.

Flow continues to S540 once the determination at S535 is positive. At S540, requests are sent to the computing system based on the now-current number of users for a predetermined time. The predetermined time is denoted t in FIG. 6. S540 is intended to allow evaluation of how the computing system behaves under a sustained load (i.e., as defined by the threshold values of the evaluated characteristics). Process 500 terminates after the predetermined time has elapsed.

Figure 7:
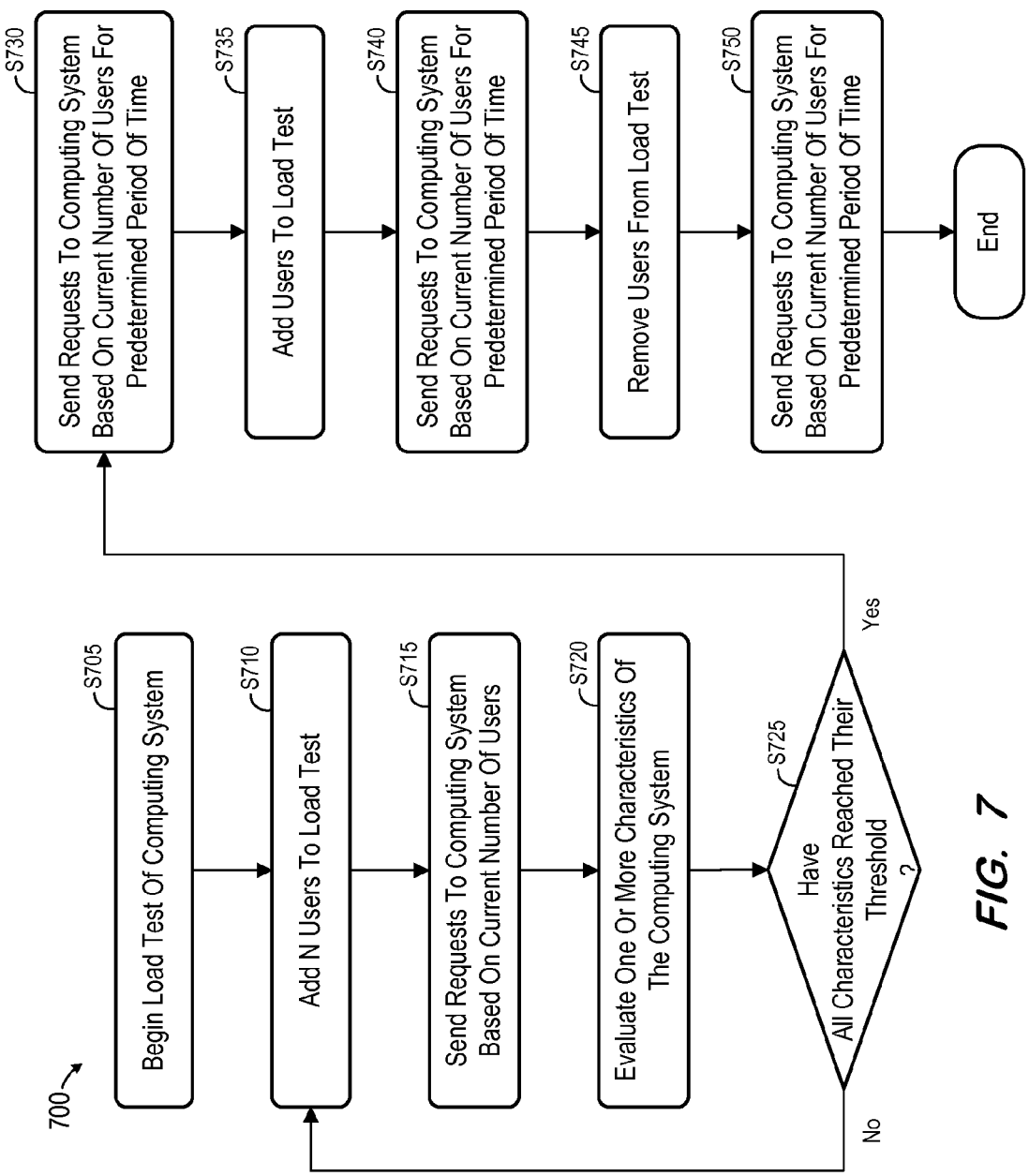
FIG. 7 is a flow diagram according to some embodiments.

FIG. 7 is a diagram of process 700 for evaluating the overload performance of a computing system according to some embodiments. A load test begins at S705 and flow cycles between S710 and S725 to "ramp up" the number of users associated with the load test until one or more relevant system characteristics have reached their associated threshold values. This ramping is illustrated as time $t_1$ of FIG. 8.

Next, at S730, requests are sent to the computing system based on the current number of users for a predetermined period of time. This predetermined period is illustrated as $t_2$ of FIG. 8 and, as shown, the number of users remains constant during this time.

Figure 8:
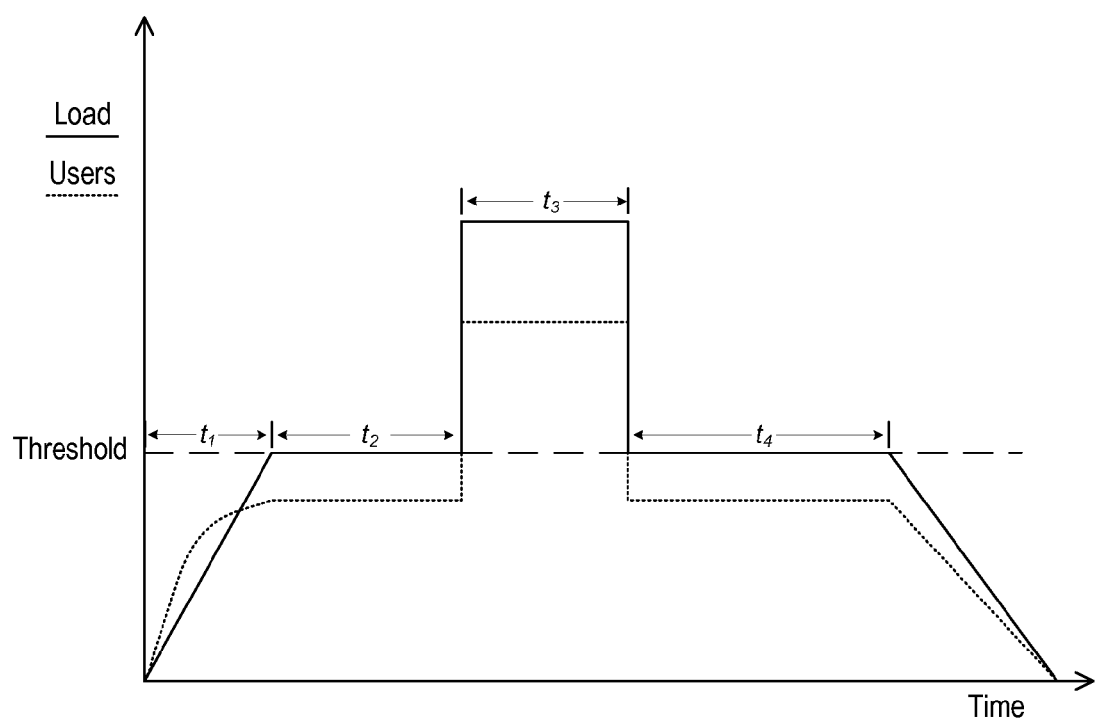
FIG. 8 is a diagram illustrating operation of a system according to some embodiments.

Another number of users (i.e., X) is added to the load test at S735. In some embodiments, the added number is equal to the current number, thereby doubling the number of users. Requests are then sent to the computing system at S740 based on the now-current number of users for another predetermined period of time. FIG. 8 illustrates a doubling of the number of users and sending of requests based on that number during time period $t_3$.

Next, at S745, a number of users are removed from the load test. The number of users removed may be equal to the number added at S735, but embodiments are not limited thereto. Requests are sent to the computing system at S750 based on the now-current number of users for yet another predetermined period of time. FIG. 8 illustrates a reduction of the number of users and the sending of requests based on the new number during time period $t_4$. No further requests are sent after S750.

Various characteristics of a computing system may be monitored throughout any of the above processes, including during the predetermined time periods during which requests are sent based on a current number of users. The results of such monitoring may facilitate evaluations of the computing system after the conclusion of any of the above processes.

Figure 9:
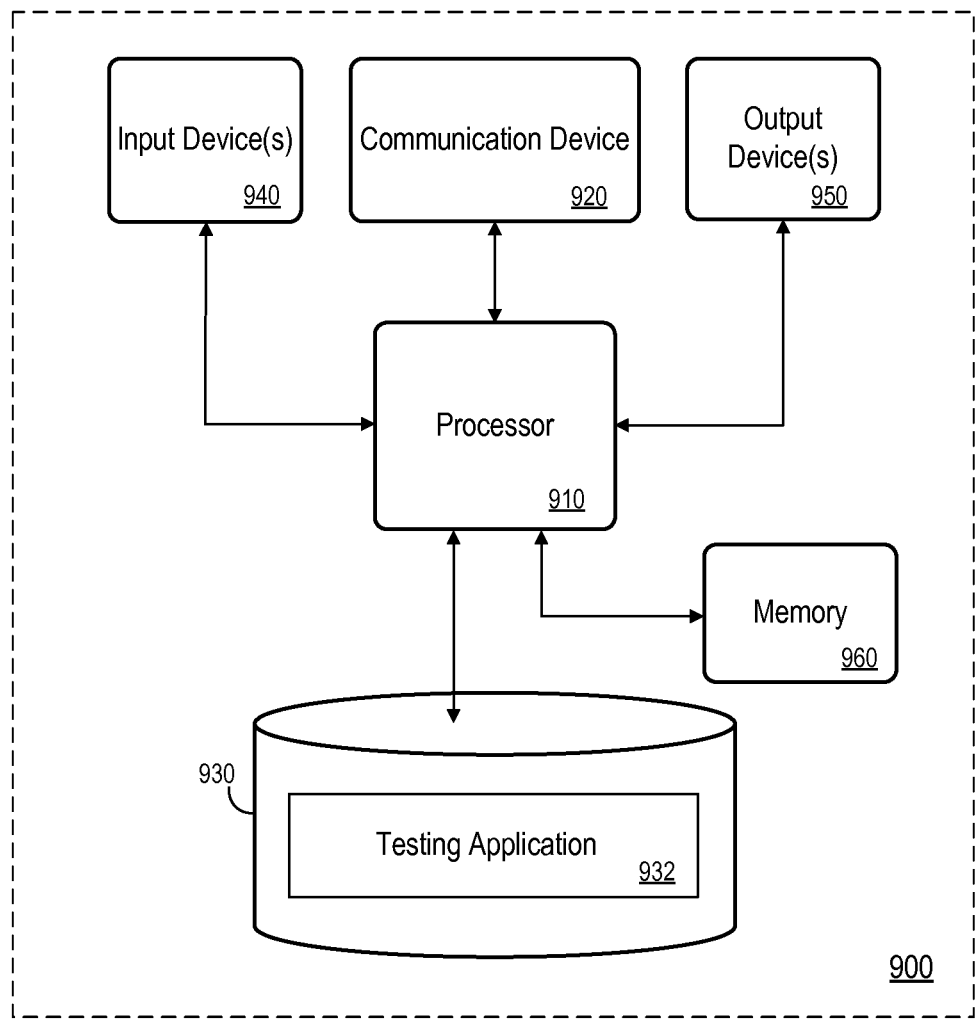
FIG. 9 is a block diagram of a hardware system according to some embodiments.

FIG. 9 is a block diagram of system 900 according to some embodiments. System 900 illustrates one hardware architecture implementing testing system 120 as described above, but implementations of testing system 120 are not limited thereto. Elements of system 900 may therefore operate to execute methods as described above. System 900 may include other unshown elements according to some embodiments.

System 900 includes processor 910 operatively coupled to communication device 920, data storage device 930, one or more input devices 940, one or more output devices 950 and memory 960. Communication device 920 may facilitate communication with external devices, such as an external design tool. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Testing application 932 of data storage device 930 may comprise program code executable by processor 910 to provide any of the functions described herein, including but not limited to processes 200, 300, 500 and 700. Embodiments are not limited to execution of these functions by a single apparatus. Data storage device 930 may also store data and other program code for providing additional functionality and/or which are necessary for operation thereof, such as device drivers, operating system files, etc.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
   sending requests to a computing system based on a first number of users associated with a load test;
   while continuing to send the requests, evaluating one or more characteristics of the computing system;
   while continuing to send the requests, determining to modify the first number of users to a second number of users based on the one or more evaluated characteristics;
   in response to the determination to modify the first number of users to the second number of users, sending requests to the computing system based on the second number of users, and
   while continuing to send the requests, determining whether to abort and restart the load test based on a number of times users have been added to the load test.

2. A method according to claim 1, wherein the characteristic indicates a usage level of one or more system resources of the computing system.

3. A method according to claim 1, wherein sending requests to the computing system based on the first number of users associated with the load test comprises:
   sending requests to the computing system based on the first number of users associated with the load test for a predetermined time period.

4. A method according to claim 1, wherein determining to modify the first number of users comprises:
   determining whether a value of one or more of the evaluated characteristics has reached a threshold.

5. A method according to claim 4, further comprising:
   while continuing to send the requests, determining that the threshold has been reached; and
   in response to the determination that the threshold has been reached, continuing to send requests to the computing system based on the current number of users for a predetermined time period.

6. A method according to claim 5, further comprising:
   adding a third number of users to the load test;
   sending requests to the computing system based on a second current number of users associated with the load test for a second predetermined time period;
   removing a fourth number of users from the load test; and
   sending requests to the computing system based on a third current number of users associated with the load test for a third predetermined time period.

7. A non-transitory medium storing computer-executable program code, the program code executable by a computing device to:
   send requests to a computing system based on a first number of users associated with a load test;
   while continuing to send the requests, evaluate one or more characteristics of the computing system while sending the requests;
   while continuing to send the requests, determine to modify the first number of users to a second number of users based on the one or more evaluated characteristics;
   in response to the determination to modify the first number of users to the second number of users, send requests to the computing system based on the second number of users, and
   while continuing to send the requests, determine whether to abort and restart the load test based on a number of times users have been added to the load test.

8. A medium according to claim 7, wherein the characteristic indicates a usage level of one or more system resources of the computing system.

9. A medium according to claim 7, wherein the sending of requests to the computing system based on the first number of users associated with the load test comprises:
   sending of requests to the computing system based on the first number of users associated with the load test for a predetermined time period.

10. A medium according to claim 7, the program code to determine to modify the first number of users further executable by a computing device to:
    while continuing to send the requests, determine whether a value of one or more of the evaluated characteristics has reached a threshold.

11. A medium according to claim 10, the program code further executable by a computing device to:
    while continuing to send the requests, determine that the threshold has been reached; and
    in response to the determination that the threshold has been reached, continue to send requests to the computing system based on the current number of users for a predetermined time period.

12. A medium according to claim 11, the program code further executable by a computing device to:
    add a third number of users to the load test;
    send requests to the computing system based on a second current number of users associated with the load test for a second predetermined time period;
    remove a fourth number of users from the load test; and
    send requests to the computing system based on a third current number of users associated with the load test for a third predetermined time period.

13. A system comprising:
    a computing system comprising a first processor and a first memory; and
    a testing system comprising a second processor and a second memory, the testing system to:
    send requests to the computing system based on a first number of users associated with a load test;
    while continuing to send the requests, evaluate one or more characteristics of the computing system while sending the requests;
    while continuing to send the requests, determine to modify the first number of users to a second number of users based on the one or more evaluated characteristics;
    in response to the determination to modify the first number of users to the second number of users, send requests to the computing system based on the second number of users, and
    determine whether to abort and restart the load test based on a number of times users have been added to the load test.

14. A system according to claim 13, wherein the sending of requests to the computing system based on the first number of users associated with the load test comprises:
    sending of requests to the computing system based on the first number of users associated with the load test for a predetermined time period.

15. A system according to claim 13, wherein the determination to modify the first number of users comprises:
    determination of whether a value of one or more of the evaluated characteristics has reached a threshold.

16. A system according to claim 15, the testing system further to:
   while continuing to send the requests, determine that the threshold has been reached; and
   in response to the determination that the threshold has been reached, continue to send requests to the computing system based on the current number of users for a predetermined time period.

17. A system according to claim 16, the testing system further to:
   add a third number of users to the load test;
   send requests to the computing system based on a second current number of users associated with the load test for a second predetermined time period;
   remove a fourth number of users from the load test; and
   send requests to the computing system based on a third current number of users associated with the load test for a third predetermined time period.

* * * * *